United States Patent [19]

Korpman

[11] Patent Number: 5,439,963
[45] Date of Patent: Aug. 8, 1995

[54] CURED THERMOPLASTIC HIGH TACK PRESSURE SENSITIVE ADHESIVE

[75] Inventor: Ralf Korpman, Bridgewater, N.J.

[73] Assignee: Permacel, New Brunswick, N.J.

[21] Appl. No.: 370,230

[22] Filed: Jan. 9, 1995

Related U.S. Application Data

[63] Continuation of Ser. No. 140,762, Oct. 21, 1993, abandoned.

[51] Int. Cl.⁶ .................. C08L 93/04; C08L 53/02; C08L 61/10
[52] U.S. Cl. .................... 524/271; 524/274; 524/505; 524/509; 525/98
[58] Field of Search ........... 524/271, 274, 505, 509; 525/98

[56] References Cited

U.S. PATENT DOCUMENTS

| | | | |
|---|---|---|---|
| 3,625,752 | 12/1971 | Korpman | 428/355 |
| 3,923,722 | 12/1975 | Lakshmanan | 524/426 |
| 3,932,328 | 1/1976 | Korpman | 524/271 |
| 3,956,223 | 5/1976 | Chiang et al. | 525/98 |
| 4,080,348 | 3/1978 | Korpman | 524/505 |
| 4,136,071 | 1/1979 | Korpman | 524/274 |
| 4,242,402 | 12/1980 | Korpman | 428/212 |
| 4,286,077 | 8/1981 | St. Clair et al. | 524/505 |
| 4,432,848 | 2/1984 | Korpman | 524/274 |
| 4,699,938 | 10/1987 | Minamizaki et al. | 524/271 |
| 4,717,749 | 1/1988 | Tang et al. | 524/271 |
| 4,983,674 | 1/1991 | Shigemoto et al. | 525/98 |
| 5,001,179 | 3/1991 | Kauffman et al. | 524/275 |
| 5,093,406 | 3/1992 | Lossner et al. | 524/274 |
| 5,194,500 | 3/1993 | Chin et al. | 525/98 |
| 5,274,036 | 12/1993 | Korpman et al. | 525/98 |

FOREIGN PATENT DOCUMENTS 0223879 11/1985 Japan ................. 525/98

Primary Examiner—Peter A. Szekely
Attorney, Agent, or Firm—Mathews, Woodbridge & Collins

[57] ABSTRACT

This invention relates to a highly tacky pressure sensitive adhesive having superior high temperature properties. The adhesive is formed of about 50–100 parts of a diblock copolymer and about 0–50 parts of a linear or radial triblock copolymer, a tackifier and a curing agent. The adhesive thus formed can be coated on a backing to form a tape and then vulcanized in situ to provide a precured or prevulcanized adhesive tape having high temperature properties and superior tack properties.

9 Claims, No Drawings

CURED THERMOPLASTIC HIGH TACK PRESSURE SENSITIVE ADHESIVE

This application is a continuation of Ser. No. 08/140,762, filed Oct. 21, 1993, now abandoned.

BACKGROUND OF THE INVENTION

1. Field of the Invention

This invention relates to a novel precured pressure sensitive adhesive adapted for high temperature performance and having high tack.

2. Description of the Related Art

Pressure sensitive adhesives are materials which have tack properties for adhesion to a variety of dissimilar surfaces. Conventional pressure sensitive adhesive composition include elastomers such as natural rubber or synthetic polyisoprene, butadiene-styrene (SBR) polymers, thermoplastic rubbers or the like. The elastomers are combined with tackifying resins, fillers, antioxidants, etc. Natural rubber systems have high tack properties at room temperature. However, uncured rubbers generally do not perform satisfactory at high temperatures. At high temperatures, the adhesive looses its internal strength and leaves a residue of the adhesive on the application surface after the adhesive has been removed.

Conventional solutions for high temperature applications have included precuring or prevulcanizing the adhesive in situ after it has been coated on the tape backing. U.S. Pat. No. 2,999,769 describes curing a natural rubber pressure sensitive adhesive for providing resistance to adhesive deposit at elevated temperatures. U.S. Pat. No. 2,999,769 has the disadvantage that the adhesive is very sensitive to the state of cure. When the adhesive is undercured, the adhesive splits resulting in a deposit on the applied surface. When the adhesive is overcured, the hold at high temperatures is not satisfactory.

U.S. Pat. No. 3,625,752 (the '752 patent), issued to the inventor of this disclosure, describes a precured thermoplastic polymer which is relatively insensitive to the exact state of the cure achieved. The thermoplastic polymer has the structure A-B-A in which A is a thermoplastic polymer block of a vinyl arene and B is an elastomeric block of isoprene. Kraton 107 sold by the Shell Oil Company was used in the examples of the '752 patent as the thermoplastic polymer. Kraton 107 is frequently referred to in the trade as a 85% coupled polymer indicating that the composition is formed by 85% of A-B-A triblock copolymer and 15% of A-B diblock copolymer. It has been found that the use of the precured Kraton 107 polymer in an adhesive has superior high temperature holding properties over a wide range of curing conditions. However, the polymer has the disadvantage of having marginal tack properties in comparison to a cured natural rubber based pressure sensitive adhesive.

U.S. Pat. No. 4,080,348, issued to the inventor of this disclosure, describes an uncured adhesive including a thermoplastic rubber consisting of 55-85 parts of A-B block copolymer and 15-45 parts of a linear or radial A-B-A copolymer and a resin component. The A blocks are styrene and the B blocks are isoprene. The U.S. Pat. No. 4,080,348 has the disadvantage that it is an uncured adhesive having poor performance at high temperatures.

Of possible relevance to the invention are U.S. Pat. Nos. 3,923,722; 4,699,938; and 4,717,749, related to pressure sensitive adhesives.

SUMMARY OF THE INVENTION

Briefly described, the present invention relates to a precured pressure sensitive adhesive formed of a triblock and diblock thermoplastic elastomeric component. It has now been discovered that an adhesive using a particular combination of the precured diblock and triblock polymers has superior high temperature holding properties and excellent tack properties. The tack properties of the adhesive of the present invention are comparable to tack properties previously only obtained with natural rubber based pressure sensitive adhesives.

Preferably, the thermoplastic component comprises about 50-100 parts of a diblock copolymer having the structure A-B and about 0-50 parts of a linear or radial triblock copolymer having the structure A-B-A, per 100 parts by weight of the thermoplastic elastomeric component, wherein A is a thermoplastic polymer block of styrene or styrene homologues and B is an elastomeric polymer block of isoprene. The curing agent is preferably present in an amount of about 5 to 40 parts by weight of the elastomeric component. A tackifier resin component can be present in an amount of about 25-150 parts for the elastomeric component.

DETAILED DESCRIPTION OF THE INVENTION

In accordance with the principals of the present invention, pressure sensitive adhesives having improved high temperature tack properties are formed by combining particular types of A-B block copolymers and A-B-A block copolymers. The A-B block copolymers and A-B-A block copolymers are thermoplastic elastomeric components. A-B block copolymers can be defined as diblock copolymers and A-B-A block copolymers can be defined as triblock copolymers.

More specifically, the thermoplastic elastomeric component comprises about 50 to 100 parts of A-B diblock copolymers and about 0 to 50 parts of linear or radial A-B-A triblock copolymers per 100 parts by weight of the thermoplastic elastomeric component. Preferably, the thermoplastic elastomeric component includes about 60-80 parts of A-B diblock copolymer and about 20-40 parts of A-B-A triblock copolymers per 100 parts by weight of the thermoplastic elastomeric component.

A-blocks of the thermoplastic elastomeric A-B and A-B-A components are derived from styrene or styrene homologues. It has been found that it is desirable that the total styrene derived A-block content of the thermoplastic elastomeric components be less than or equal to about 25 percent by weight of the total block copolymers in order to achieve the desired properties of the adhesive of the present invention.

Preferably, the A-blocks of the A-B block copolymers comprise about 10-18 percent, preferably about 12-16 percent, by weight of the A-B diblock copolymer. In the A-B-A copolymers, preferably the A-blocks comprise about 5-25 percent, preferably about 10-20 percent, by weight of the A-B-A block copolymer. B-blocks of the A-B and A-B-A block copolymers are derived from isoprene either alone or in conjunction with small portions of other monomers.

The number average molecular weight of the individual A-blocks in the A-B copolymer are about 7,000–20,000 and the total molecular weight of the A-B block copolymer generally should not exceed 150,000. In the A-B-A copolymer, the A-blocks have a number average molecular weight of at least about 7,000, preferably in the range of about 12,000–30,000. The number average molecular weight of the B-blocks for an A-B-A linear block copolymer is in the range of about 45,000 to 180,000. The A-B-A linear block polymer is in the range of about 75,000–200,000. The number average molecular weight of B-blocks in the radial block polymer is in the range of about 95,000–360,000 and the A-B-A radial block polymer is in the range of about 125,000–400,000. A-B diblock and A-B-A triblock copolymers useful for practice of this invention are described in U.S. Pat. No. 4,080,348, the contents of which are hereby incorporated by reference into this application.

A conventional diene elastomer curing system can be used as a reactive curing agent for the adhesive of the present invention. Preferably, an oil soluble heat reactive phenolformaldehyde is used as the curing agent. The curing agent is used in an amount of about 5–40 parts per 100 parts by weight of the elastomers. Preferably, about 7–20 parts of octyl phenolformaldehyde per 100 parts by weight of the elastomers is used as the curing agent. It will be appreciated that other conventional curing systems known in the art can be used.

The adhesive of the present invention includes a tackifier in the range of about 25 to about 150 parts per 100 parts by weight of the elastomers. Preferably, about 40–85 parts of tackifier per 100 parts by weight of the elastomers is used in the present invention. The tackifier can be formed of hydrocarbon resins, rosin and rosin derivatives, polyterpenes, coumarone-indene resins and any compatible conventional tackifier or mixtures thereof. The resins can be modified with alpha methyl styrene. It has been found that a mixture of resins can provide a better balance in properties than any one resin alone.

The resin curing agents described above can be combined with accelerators. Conventional accelerators such as zinc resinate or alkaline fillers as disclosed in U.S. Pat. No. 3,625,752 can be used, or acid accelerators, such as disclosed in U.S. Pat. No. 3,231,419 can be used with the adhesive and resin curing agents of the present invention. Preferably, zinc resinate is used in an amount of less than about 30 parts per 100 parts of the elastomers to retain sufficient tack of the adhesive.

The adhesives of this invention can include small amounts of other materials such as antioxidants, heat stabilizers, ultraviolet absorbers, fillers and the like. Antioxidants and heat stabilizers can be used for improved heat stability of the adhesive. Typical antioxidants are 2,5 ditertiary amyl hydroquinone, di-tertiary butyl cresol and amines. Conventional heat stabilizers such as zinc salts of alkyl dithiocarbomates can be used in the present invention. Ultraviolet absorbers can be added to the adhesive when improved outdoor weathering is desired. Also, the particulate mixture of this invention can include conventional pigments and fillers such as zinc oxide, aluminum hydrate, carbon black, clay, calcium carbonate and the like in order to extend the adhesive and alter its appearance. Colored pigments can be added to obtain a colored adhesive.

The following examples are given only by way of illustration and are not intended to limit the scope of the invention in any way. Table A gives the adhesive formulations for examples I–V. In the examples, all proportions are expressed in parts per one hundred parts by weight of the total elastomers unless otherwise indicated.

TABLE A

| Ingredients | Examples | | | | |
| --- | --- | --- | --- | --- | --- |
| | I | II | III | IV | V |
| Quintac SL105 | 100 | | | | |
| Quintac SL113 | | 100 | 100 | | 100 |
| Kraton 6403 | | | | 100 | |
| Wingtack plus | | 50 | | | |
| Wingtack 86 | 50 | | | 50 | 50 |
| Piccolyte S115 | | | 40 | | |
| Schenectady SP1044 | 15 | 15 | 15 | 15 | 10 |
| Zinc resinate | 10 | 10 | 10 | 10 | 10 |
| Zinc Dibutyl-dithio carbamate | 2 | 2 | 2 | 2 | 2 |
| 2,5 ditertiary-amyl-hydroquinone | 1 | 1 | 1 | 1 | 1 |
| % solids in Toluene | 50 | 50 | 50 | 50 | 50 |

With respect to the foregoing examples, the following comments are made with respect to a number of ingredients listed in the examples.

Quintac SL105 is an elastomeric and thermoplastic styrene-isoprene A-B-A block copolymer rubber having about 52% A-B diblock copolymer and 48% A-B-A triblock copolymer and is offered commercially by Nippon-Zeon Company. This polymer has a styrene content of 16% and number average molecular weight of 170,000.

Quintac SL113 is an elastomeric and thermoplastic styrene-isoprene A-B-A block of copolymer rubber having about 78% of A-B diblock polymer of styrene-isoprene and 22% A-B-A triblock of styrene-isoprene-styrene and is offered commercially by Nippon Zeon Company. This polymer has a styrene content of 15% and a number average molecular weight of 200,000.

Kraton 6403 is an A-B-A block copolymer rubber having 52% diblock of styrene-isoprene and 48% triblock of styrene-isoprenestyrene and it is offered commercially by the Shell Chemical Company. This polymer has a styrene content of 15% and number average molecular weight of 220,000.

Wingtack 86 and Wingtack plus are synthetic hydrocarbon tackifying resins polymerized mainly from a mixture of C5 and C6 streams and modified with alpha methyl styrene. The resins melting points are approximately 86 and 95 degrees Centigrade respectively. Wingtack 86 and Wingtack Plus are offered commercially by Goodyear Tire and Rubber Company.

Piccolyte S115 is a Beta Pinene polyterpene tackifying resin having a melting point of 115 degrees Centigrade. It is offered commercially by Hercules, Inc.

Schenectady SP 1044 is an oil soluble elastomer reactive heat curing octyl phenol formaldehyde resin. It has a melting point of approximately 80 degrees Centigrade and it is offered commercially by Schenectady International Company.

The adhesive formulations of examples I–V are coated at approximately 1.5 to 1.7 ounces per square yard, dry weight, on a conventional impregnated and backsized creped masking tape backing and then dried and cured for approximately four minutes at 300° F. The cured product is then slit into tapes approximately one inch wide. The resulting tapes possess good tack at high temperatures.

Table B gives results on adhesion of the formulation of Example V in comparison with a typical cured natural rubber and a cured thermoplastic rubber adhesive as described in U.S. Pat. No. 3,625,752.

TABLE B

| Ingredients and Characteristics | % S-I | VI Adhesion to steel ozs/inch | VII Probe Tack gms | VIII 90 degrees adhesion gms/inch at 300° F. |
|---|---|---|---|---|
| Cured Natural Rubber adhesive | 0 | 50 | 315 | 80 |
| Cured Thermoplastic rubber adhesive U.S. Pat. 3,625,752 | 15 | 41 | 225 | 120 |
| Present Invention Example V | 78 | 50 | 361 | 250 |

Probe tack is measured by the standard ASTM D-14 test method with a polyken probe tack tester as described in Handbook of Pressure Sensitive Adhesives, Second Edition, D. Satas.

The 90 degrees adhesion at 300° F. test is run on a chrome panel surface. A one inch tape is applied and rolled down with a 4.5 lb. roller. The panel is heated to 300° F. and held there for 5 minutes followed with hot removal at a 90 degree angle. The force to remove the tape is measured in grams/inch.

A demonstration of the improvements obtained by the present invention is shown by Examples VI–VIII.

Example VII shows excellent tack for-an adhesive of the present invention. Example VIII indicates an improvement of high temperature tack of over 50% for the adhesive of the present invention in comparison with the prior art adhesives.

The adhesive composition of the present invention exhibits good adhesion, hold and superior tack at high temperatures.

While the invention has been described with reference to the preferred embodiment thereof, it will be appreciated by those of ordinary skill in the art that modifications can be made to the structure and form of the invention without departing from the spirit and scope thereof.

I claim:

1. A pressure sensitive pre-cured adhesive having improved temperature adhesion at a temperature of at least 300° F. prepared by heat curing of a composition comprising:

a thermoplastic elastomeric component comprising about 50–100 parts of a diblock copolymer having the structure A-B and about 0–50 parts of a lineary or radial triblock copolymer having the structure A-B-A wherein A is a thermoplastic polymer block selected from the group consisting of styrene and styrene homologues and B is an elastomeric polymer block of isoprene, about 25–150 parts per 100 parts of a tackifier resin for said elastomeric component, and about 5–40 parts of a heat reactive phenolic resin curing agent for said adhesive, all of said parts being parts by weight of the thermoplastic elastomeric component.

2. The composition of claim 1 which comprises about 60–80 parts of the diblock copolymer and about 20–40 parts of the triblock copolymer per 100 parts by weight of the thermoplastic elastomeric component.

3. The composition of claim 1 wherein the styrene A-blocks comprise less than or equal to 25 percent by weight of the thermoplastic elastomeric component.

4. The composition of claim 1 wherein the styrene A-blocks constitute about 10–18 percent by weight of the diblock copolymer.

5. The composition of claim 1 wherein the A-blocks constitute about 5–25 percent by weight of the A-B-A triblock copolymer.

6. The composition according to claim 5 wherein the A-blocks constitute about 10–20 percent by weight of the A-B-A triblock copolymer.

7. The composition according to claim 1 wherein the curing agent is present in an amount of about 2–35 parts per 100 parts by weight of the thermoplastic elastomeric component.

8. The composition according to claim 7 wherein the curing agent is present in the amount of about 7–20 parts per 100 parts by weight of the thermoplastic elastomeric component.

9. The composition of claim 1 wherein said curing agent is a phenol-formaldehyde resin.

* * * * *